United States Patent

Chen

[11] Patent Number: 5,949,936
[45] Date of Patent: Sep. 7, 1999

[54] APPARATUS AND METHOD OF MAKING A FUSED DENSE WAVELENGTH-DIVISION MULTIPLEXER

[75] Inventor: Peter Zupei Chen, Fremont, Calif.

[73] Assignee: Applied Fiber Optics, Inc., Fremont, Calif.

[21] Appl. No.: 09/146,996

[22] Filed: Sep. 4, 1998

Related U.S. Application Data

[63] Continuation of application No. 08/799,582, May 19, 1998, Pat. No. 5,809,190.

[51] Int. Cl.⁶ ........................................................ G02B 6/26
[52] U.S. Cl. .............................................. 385/50; 385/147
[58] Field of Search .................. 385/43, 50, 51, 385/95, 96, 147

[56] References Cited

U.S. PATENT DOCUMENTS

| | | | |
|---|---|---|---|
| 4,426,215 | 1/1984 | Murphy | 65/402 |
| 4,550,974 | 11/1985 | Murphy | 385/43 |
| 4,725,141 | 2/1988 | Georgiou et al. | 356/345 |
| 5,216,731 | 6/1993 | Murphy et al. | 65/410 |
| 5,301,001 | 4/1994 | Murphy et al. | 356/35.5 |
| 5,339,374 | 8/1994 | Murphy et al. | 385/43 |
| 5,809,190 | 9/1998 | Chen | 385/43 |

*Primary Examiner*—Akm E. Ullah
*Attorney, Agent, or Firm*—Skjerven, Morrill, MacPherson, Franklin & Friel LLP; Alan H. MacPherson

[57] ABSTRACT

The present invention relates to an apparatus and method of making a Dense Wavelength-Division Multiplexer (DWDM) using a Fused-Biconical Taper ("FBT") technique. The DWDM according to the present invention comprises a multiple of Multi-window Wavelength-Division Multiplexers ("MWDMs") which cascade together in several stages, each stage has several MWDMs having an identical window spacing. For a N-channel DWDM, there are $2^{m-1}$ MWDMs cascaded in m-th stage, and the window spacing of the m-th stage MWDMs is $2^{m-1}\Delta\lambda$, where m is from 1 to (logN/log2), for example, the first stage(m=1) having 1 MWDM and the window spacing is $\Delta\lambda$, the second stage(m=2) having 2 MWDMs and the window spacing is $2\Delta\lambda$, the third stage(m=3) having 4 MWDMs and the window spacing is $4\Delta\lambda$, etc., and the (logN/log2)-th stage has (N/2) MWDMs with a window spacing (N/2)$\Delta\lambda$. The number N could be 2, 4, 8, 16 or more.

1 Claim, 11 Drawing Sheets

APPARATUS AND METHOD OF MAKING A FUSED DENSE WAVELENGTH-DIVISION MULTIPLEXER

This application is a continuation of Ser. No. 08/799,582 filed May 19, 1998, now U.S. Pat. No. 5,809,190.

FIELD OF INVENTION

The present invention relates generally to Dense Wavelength-Division Multiplexer (DWDM), in particularly, relates to an apparatus and method of making a Dense Wavelength-Division Multiplexer using a Fused-Biconical Taper ("FBT") technique.

BACKGROUND OF THE INVENTION

Modem information infrastructure requires constant expansions of transmission bandwidth to meet the need for high speed data transmission. Such need becomes increasingly imminent as the use of Internet to transmit a variety of data such as text, voice and video grows rapidly each year. As a consequence, the conventional coax cable system can no longer sustain this need due to a high transmission rate in the order of several tens of Gb/s is required for Internet transmission while the coax cable system is capable of providing a transmission rate only in the order of several tens of Mb/s. As an alternate, optical fiber, because its potential to achieve a high transmission bandwidth up to 100 Teraherz and to decrease transmission loss, is replacing coax cable as the building blocks for future high speed communication network.

Several fiber optic transmission systems have been proposed or developed. Among them, the Dense Wavelength-Division Multiplexing (DWDM) technology make it possible to raise the communication capacity for a single line fiber from about 2.5 Gb/s up to over 10 Gb/s. It allows several wavelength of light signals transmitting at one single fiber at the same time without wavelength interference, each wavelength carrying different information signals to different destinations. The DWDM technology therefore holds the promise of greatly expanding telecommunication infrastructure without additional construction.

DWDM may be suitably incorporated into a variety of optic fiber systems to provide aforementioned advantages. For instance, DWDM can be used in a uni-directional optical fiber system to multiplex a number of signals, each about 2.5 Gb/s, derived from input fibers at the transmitting end into a single optical fiber and subsequently demultiplex such signals from this single fiber optical line into a number of fibers carrying various channels to individual receivers at the receiving end. Similarly, DWDM can be used in a bi-directional optical fiber system in which DWDM is used to multiplex and demultiplex at both transmitting and receiving end. The lightwave transmission capacity per fiber depends mainly on the number of the light signals in the passband of the fiber optical amplifier known as Erbium-doped amplifiers. The bandwidth of the commercial Erbium-doped amplifiers is about 30 nm at two communication bands, 1260–1360 nm and 1500–1650 nm. The bandwidth of the light source is as narrow as 0.2 nm in DFB semiconductor laser. Most current DWDMs are capable of multiplexing or demultiplexing 4 (i.e., defined as a 1×4 DWDM), 8 (i.e., defined as a 1×8 DWDM) or 16 (i.e., defined as a 1×16 DWDM) optical signals located in different waveband to or from one fiber optical line. As such, DWDM is being used widely in all kinds of fiber optical system DWDM and becomes one of the key components in modern fiber optical systems.

A few Discrete Micro-Optic technologies have been successfully developed to construct DWDM such as Filter-DWDM using multi-layer interference filters, Grating-DWDM using holographic gratings and waveguide-DWDM using optical circuit waveguides. These devices are, however, disadvantaged by a limitation that the light signals transmitted thereof have to leave the optical fiber first, processing in free space and then reinput the optical fiber in operation. This has led to serious difficulties in device manufacturing and adjusting.

U.S. Pat. No. 5,491,764 using twist FBT technique to make a narrow band Wavelength Division Multiplexer ("WDM") capable of multiplexing or demultiplexing two light signals known as two-channel WDM. This prior art device, however, does not teach construction of a narrow band WDM capable of multiplexing or demultiplexing a plurality of light signals requiring more than two channels because such prior art WDM is disadvantaged by high transmission losses resulting in a poor wavelength isolation insufficient to provide multi-wavelength transmission.

There is therefore an apparent need for an apparatus and method of making a low loss, inexpensive DWDM capable of providing a reliable multi-wavelength transmission in a fiber optical transmission system.

Accordingly, it is an object of this invention to provide a low loss, inexpensive and reliable narrow band DWDM comprising a plurality of FBT multi-window Wavelength Division Multiplexers ("MWDMs") for high speed, multi-wavelength transmission.

It is a further object of this invention to provide a method of making such FBT MWDMs by heating and stretching two optical fibers to form a FBT MWDM.

SUMMARY OF THE INVENTION

The present invention represents an advancement in the art in that it produces methods for making an inexpensive and reliable DWDM that substantially obviates the problems of prior art WDM.

Prior to discussions of the present invention in details, it is necessary to set forth briefly the basic characteristics of a MWDM according to the present invention. A typical MWDM usually has two or more operation windows in each channel of the MWDM in a passband of the Erbium-doped fiber amplifier wherein the passband are 1260 nm–1360 nm and 1500 nm–1600 nm. The window positions of an individual channel are located at a high-loss wavelength region of the other channel such that the window positions of each channel are complemented to each other. All windows in the channels of the MWDM are periodically distributed with roughly the same window spacing period. A DWDM of the present invention may comprise several or a plurality of MWDMs.

A DWDM of the present invention comprises a multiple of MWDMs which cascade together in several stages, each stage has several MWDMs having an identical window spacing. For a N-channel DWDM, there are $2^{m-1}$ MWDMs cascaded in m-th stage and the window spacing of the m-th stage MWDMs is $2^{m-1} \Delta\lambda$, where m is from 1 to (logN/log2), for example, the first stage(m=1) having 1 MWDM and the window spacing is $\Delta\lambda$, the second stage(m=2) having 2 MWDMs and the window spacing is $2\Delta\lambda$, the third stage (m=3) having 4 MWDMs and the window spacing is $4\Delta\lambda$, etc., and the (logN/log2)-th stage has (N/2) MWDMs with a window spacing $(N/2)\Delta\lambda$. The number N could be 2, 4, 8, 16 or more.

The FBT MWDM provided by the invention is based on the mode interference in a fusing area. It comprises a crossed pair of first and second optical fibers about the same diameter fused together by a heating source at a middle position, the two fibers each having a longitudinal core surrounding by claddings. The two longitudinal cores and the claddings gradually tapered at an angle together at an extended middle portion thereof merging to form a fiber cavity for a distance having a smaller diameter than the diameter of the two fibers. The fused fiber is reversedly tapered at the same angle separating into two fibers again, forming a 2×2 MWDM which can also be used as a 1×2 MWDM with two branch channels. Both of the branch channels have the same window spacing and their window transmission positions are complemented with each other. The FBT MWDM further comprises a quartz substrate for maintaining a coupling region in a stable temperature.

To make a FBT MWDM, first select two optical fibers about the same diameter, remove the buffer at a middle position for the two fibers, pull the two fibers axially with an angle and force an extended middle portion of the two fibers together, then heat the middle portion of the two fibers by a heating source, at the same time stretch the two fibers axially for a distance until a mode interference has occurred and then the characteristics of MWDM has appeared. The fused fibers are subsequently glued to a quartz substrate followed by sealing them to a container to make the FBT MWDM.

DETAILED DESCRIPTION OF THE INVENTION

Figure 1:
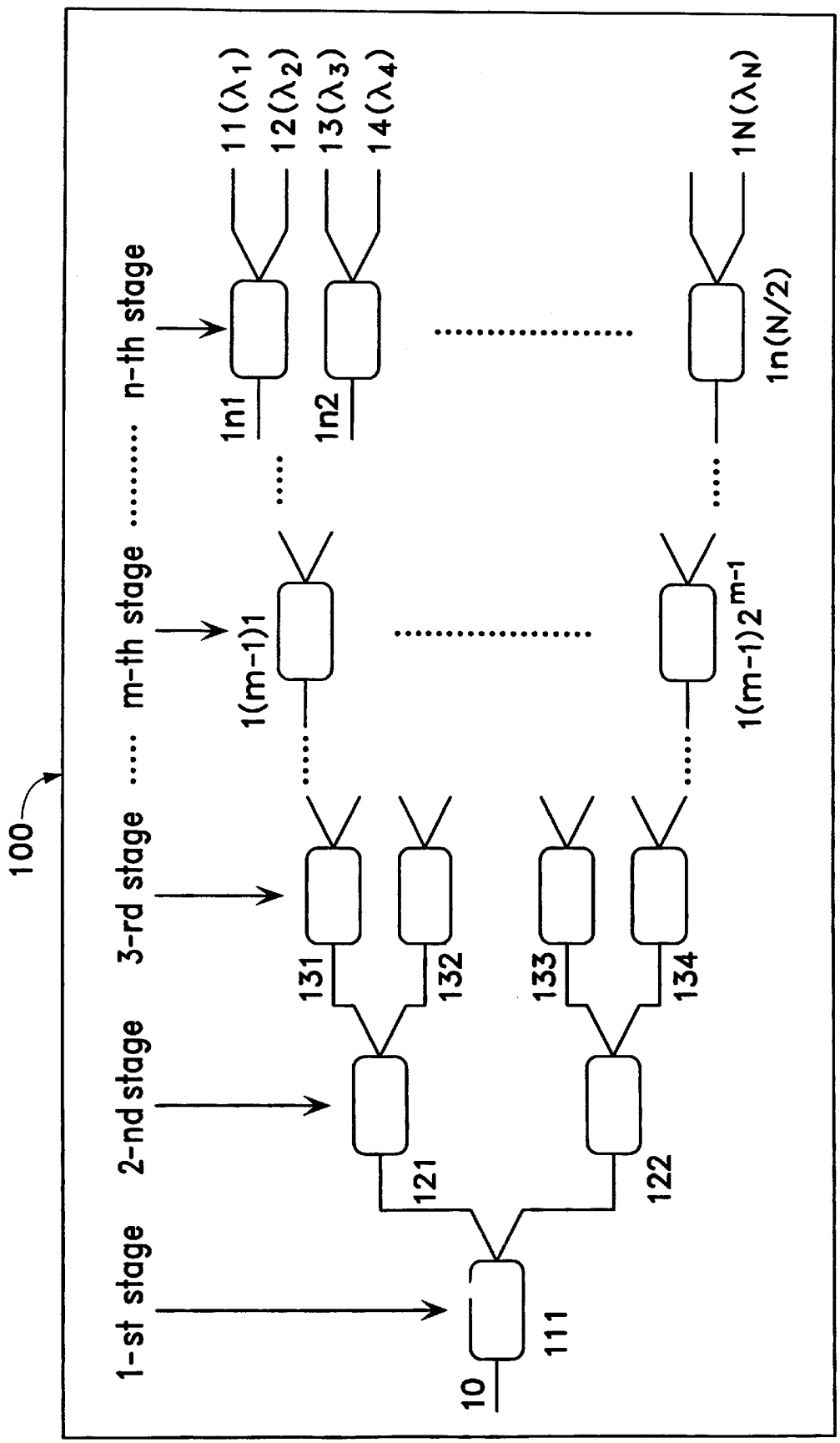
FIG. 1 is the schematic diagram of an optical circuit of a N-channel dense wavelength-division multiplexer (DWDM) of present invention.

Referring to FIG. 1, there is shown a schematic logic circuit of an exemplary embodiment of a 1×N DWDM 100 of the present invention. The symbol "N" indicates the number of channels that are used to multiplex or demultiplex by the DWDM 100 any given input signals originated from an input fiber. The number "N" is equal to $2^m$ wherein "m" represents the number of times the DWDM 100 performing signal divisions for the given input signals prior to their being demultiplexed at a receiving end. As such, the DWDM 100 is known as a m-stage DWDM in which a MWDM 111 is a first stage WDM having a window spacing $\Delta\lambda$. Likewise, MWDMs 121, 122 are a pair of second stage WDMs, each with a window spacing $2\Delta\lambda$. MWDMs 131, 132, 133 and 134 are a plurality of third stage WDMs, each having a window spacing $4\Delta\lambda$. Each of the WDMs has a window with a center wavelength which varies with such WDM's stage sequence constituting the DWDM 100. Accordingly, it is theoretically possible to construct a DWDM in accordance with the present invention in which symbols 1m1, 1m2, ..., and $1m(2^{m-1})$ designate respectively each of the m-th stage WDMs constituting the DWDM. The channel window spacing of the m-th stage MWDMs is $2^{m-1}\Delta\lambda$, which is twice larger than a window spacing demonstrated by a m-1-th stage MWDM, yet one half of the size as compared to a window spacing demonstrated by a m+1-th stage MWDM. The number of stages, m, may be from 1 to n, wherein n=logN/log2, to form a plurality of n-th stage MWDMs, 1n1, 1n2, ..., 1n(N/2). Each of the constituting WDMs could be a regular narrowband WDM. Each channel has only one window having a characteristic center wavelength identical to or in close resemblance to a particular center wavelength originated from and transmitted by the corresponding windows in the first stage WDM. For instance, each of the windows included in the channel pathways 111–131 and 111–132 has a center wavelength identical to a center wavelength in a corresponding window of the channel 121. Each of the windows in the channel pathways 111–133 as well as 111–134 has a center wavelength identical to a center wavelength in a corresponding window of the channel 122.

Figure 8A:
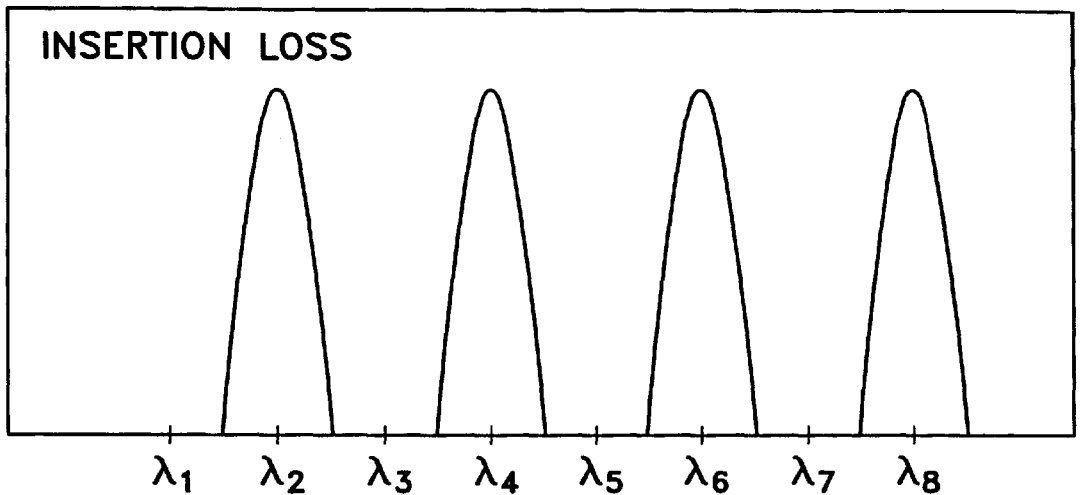
FIGS. 8 A and B are insertion loss-wavelength diagram of a DWDM of present invention.
Figure 8B:
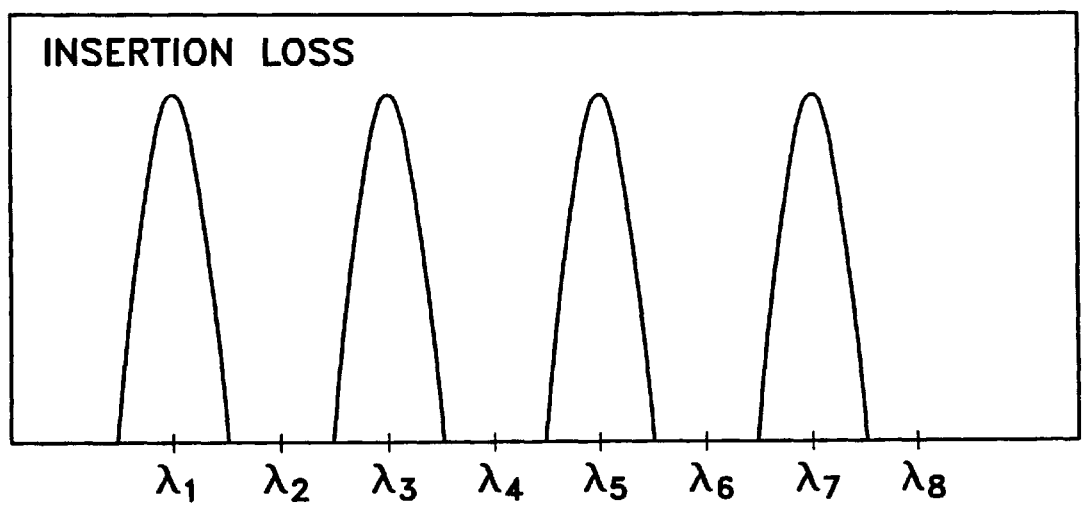

For demultiplexing application, lightwave signals entered from a fiber 10 to the MWDM 111 according to the present invention are demultiplexed into two series. The first series is transmitted to the WDM 121 with wavelengths $\lambda_1, \lambda_3, \ldots, \lambda_{N-1}$. The second series is transmitted to the WDM 122 with wavelengths $\lambda_2, \lambda_4, \ldots, \lambda_N$. FIGS. 8A and 8B show a typical spectral transmission of the two series lightwave signals with respect to wavelength distributions in which N is 8. After multiple demultiplexing in next stages the light signals are demultiplexed into N individual channels and transmitted to N individual fibers 11, 12, ..., 1N. Multiplexing processing works just the reverse way lightwave signals transmitting from N individual fiber 11, 12, ..., and 1N are multiplexed into one fiber 10 as illustrated in FIGS. 8a and 8b.

Figure 2:
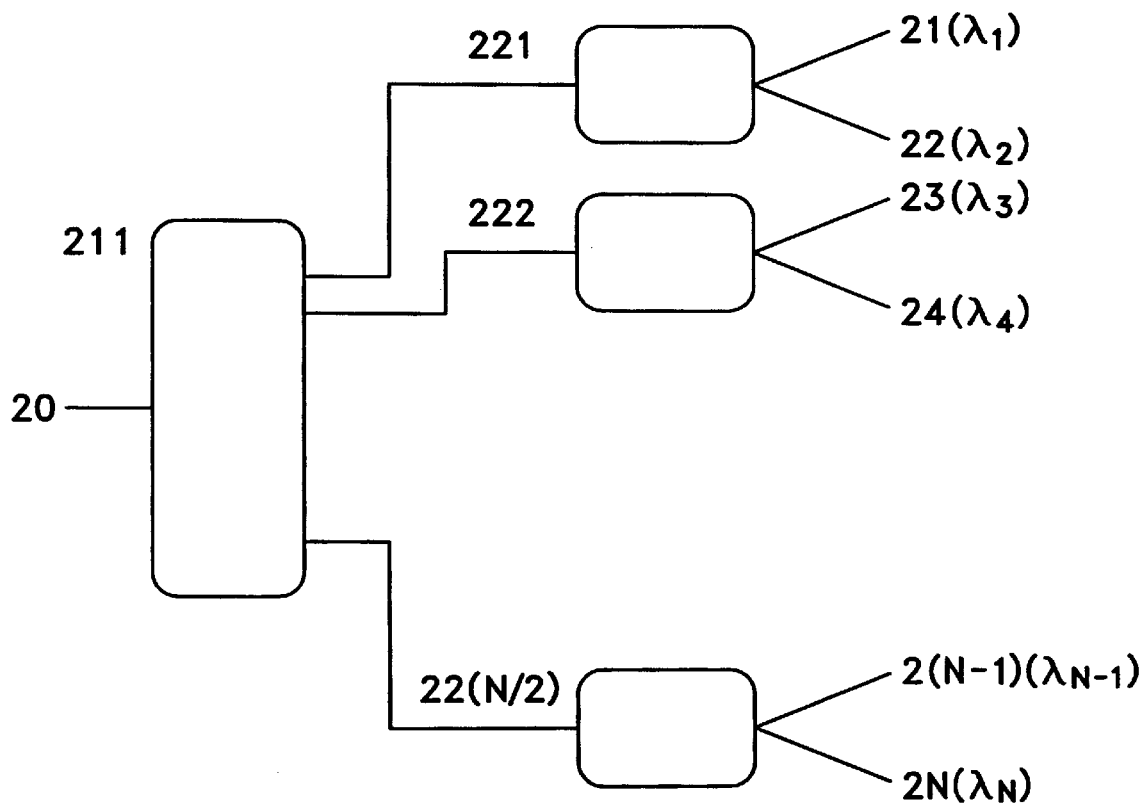
FIG. 2 is the schematic diagram of second embodiment of the optical circuit of a N-channel dense wavelength-division multiplexer (1×N DWDM) of present invention.

FIG. 2 shows a schematic logic circuit of another exemplary embodiment of a 1×N DWDM 200 of the present invention. It includes a n-1 stage DWDM 211 and a series of N/2 narrowband WDMs 221, 222, ..., and 22(N/2), where $2^n$=N. They are cascadedly connected. The channel spacing of the narrowband WDMs 221, 222, ..., and 22(N/2) are half of the channel spacing of the DWDM 211. The center wavelength of each channel of the DWDM 211 is an average value of the two center wavelengths of two branch channels in the narrowband WDMs connected to the channel of 211.

For demultiplexing application, lightwave signals entered from a fiber 20 to 211 are demultiplexed to N/2 individual lights with different center wavelengths, $(\lambda_1+\lambda_2)/2, (\lambda_3+\lambda_4)/2, \ldots, (\lambda_{N-1}+\lambda_N)/2$. Each lightwave signal is demultiplexed to two signals in each of the WDMS 221, 222, ..., and 22(N/2) such that the lightwave signals from the fiber 20 are demultiplexed to N individual fibers. In other words, the lightwave signal with the center wavelength $(\lambda_1+\lambda_2)/2$ is divided to two light signals transmitting in the fiber 21 with a center wavelength $\lambda_1$ and the fiber 22 with a center wavelength $\lambda_2$. The lightwave signal with the center wavelength $(\lambda_3+\lambda_4)/2$ is divided to two light signals transmitting in the fiber 23 with a center wavelength $\lambda_3$ and the fiber 24 with a center wavelength$_4\lambda$ and, likewise, the lightwave signal with the center wavelength $(\lambda_{N-1}+\lambda_N)/2$ is divided to two light signals transmitting in the fiber 2(N-1) with a center wavelength $\lambda_{N-1}$ and the fiber 2N with a center wavelength $\lambda_N$. The multiplexing processing works just the reverse way in which the N light signals transmitting from N individual fibers 21, 22, . . . , and 2N are multiplexed into the single one fiber 20.

Figure 3A:
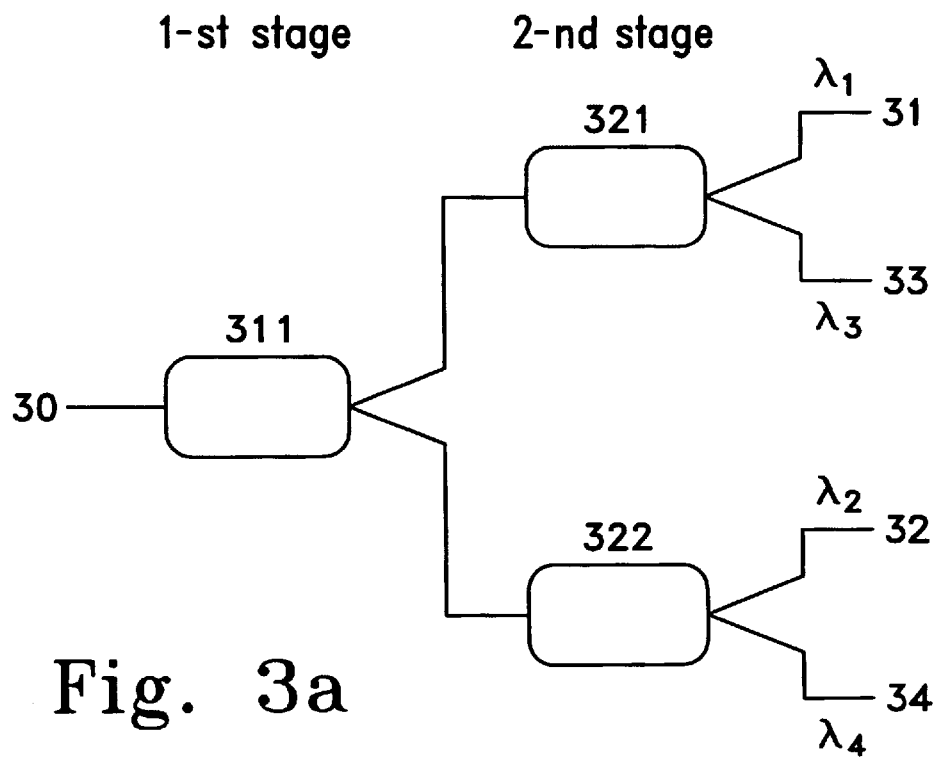
FIG. 3A is the schematic diagram of the optical circuit of a 4-channel dense wavelength-division multiplexer (1×4 DWDM) of present invention.
Figure 3B:
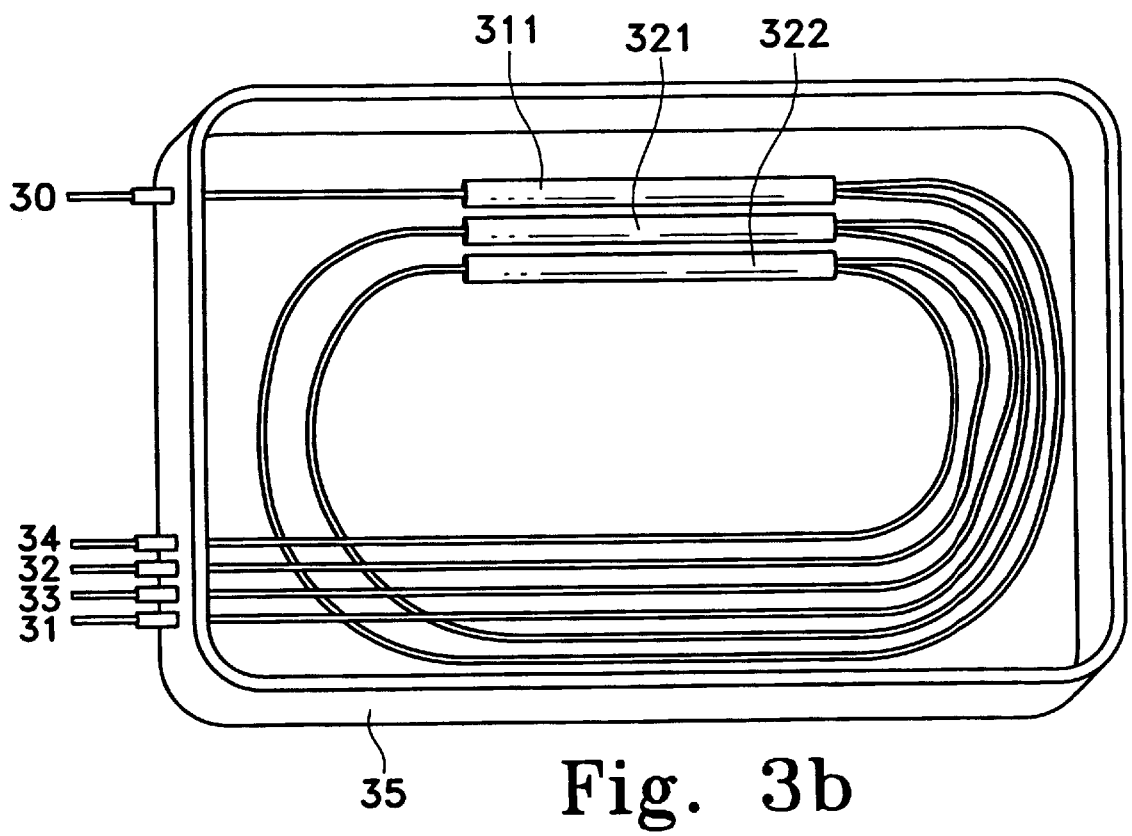
FIG. 3B is a front view of one embodiment of the 1×4 DWDM.
Figure 3C:
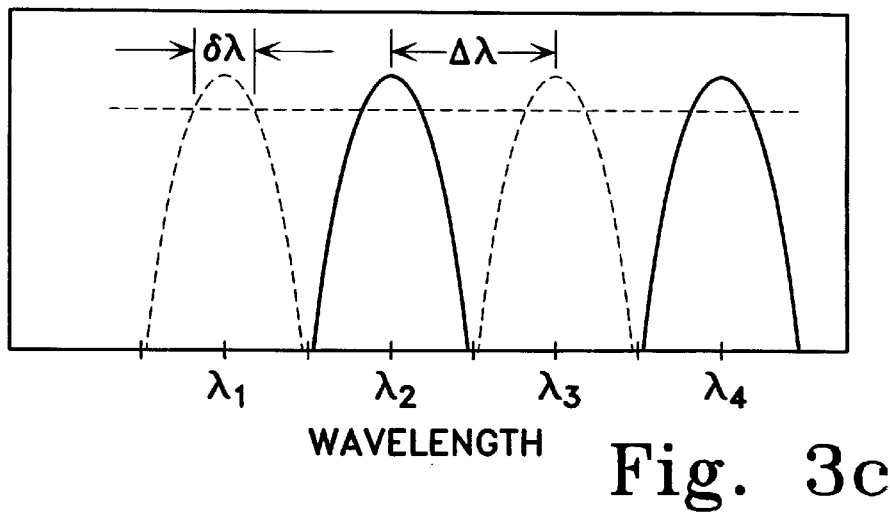
FIGS. 3C, 3D, 3E are respective spectral insertion loss for MWDMs 311, 321 and 322.
Figure 3D:
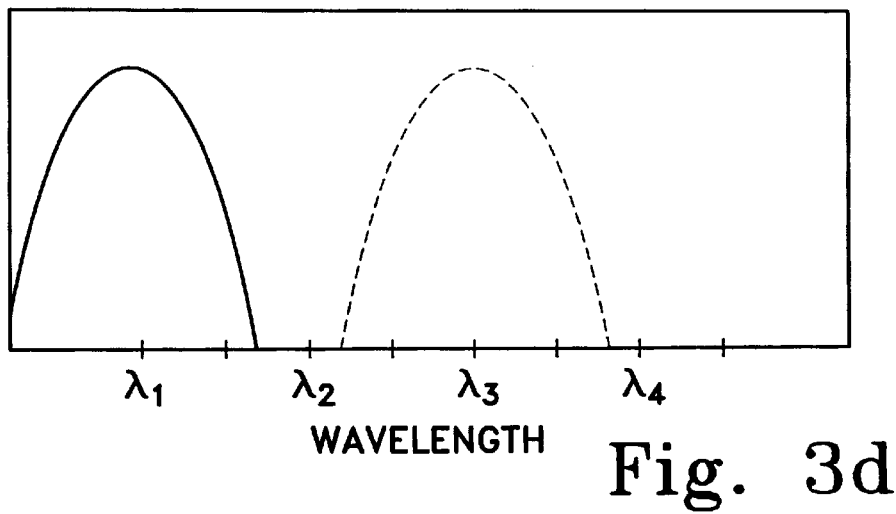
Figure 3E:
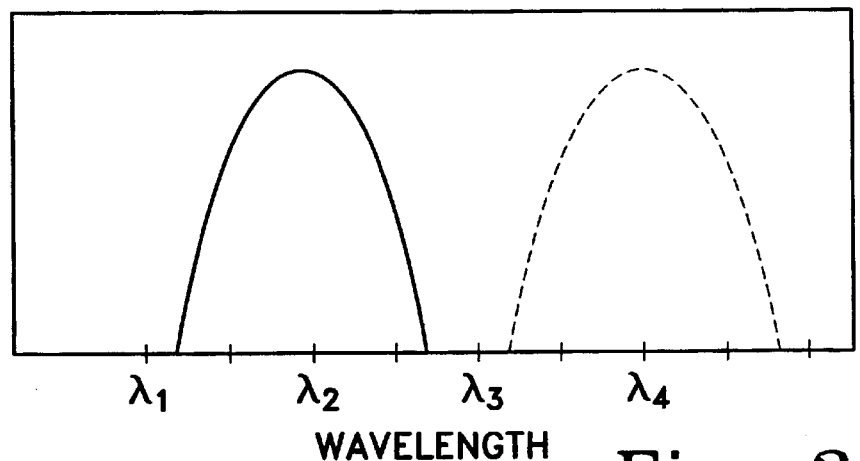

Referring to FIGS. 3A–3E, the embodiments set forth above in FIGS. 1 and 2, are further elaborated by way of examples. These examples are intended for purposes of illustration and should not be construed as any means for limitation. As an example, a 1×4 DWDM of present invention is a 2 stage DWDM including 3 MWDMs cascadedly connected and sealed within a container. FIG. 3a shows the logic circuit of a 1×4 DWDM 300 which is also known as a 4-channel DWDM according to the present invention. The first stage MWDM 311 is connected to two second stage MWDMs 321 and 322. For multiplexing processing, light signals $\lambda_1, \lambda_2, \lambda_3,$ and $\lambda_4$ are entered to fibers 31, 32, 33 and 34 respectively. The MWDM 321 multiplexes the light signals $\lambda_1$, and $\lambda_3$ into the channel 30–321. The window spacing of channels 311-31 and 311-33 is about 4Δλ. The MWDM 322 multiplexing the light signals $\lambda_2$ and $\lambda_4$ into the channel 30-322. The window spacing of 311-32 and 311-34 is about 4Δλ. The MWDM 311 multiplexes the light signals at the channels 30-321 and 30-322 into the fiber 30. The window spacing of the channels 30-311 and 30-322 are about 2 Δλ, which is one half of the window spacing as those of channels 311-31, 311-33, 311-32 and 311-34 such that the three MWDMs work together to multiplex four single light signals with center wavelengths $\lambda_1, \lambda_2, \lambda_3,$ and $\lambda_4$ transmitted in four individual fibers into one fiber. FIG. 3B is a front view of an actual physical structure diagram of the 1×4 DWDM described herein. The MWDMs 311, 321 and 322 are cascaded according to the optical circuit described in FIG. 3A and packaged in a container 35. The demultiplexing processing works just the reverse way in which the lightwave signals transmitted in the fiber 30, having four windows positions at center wavelengths $\lambda_1, \lambda_2, \lambda_3,$ and $\lambda_4$, are demultiplexed to four single window light signals transmitting at individual fibers 31, 32, 33 and 34. FIGS. 3C, 3D, and 3E show the respective spectral insertion loss of the MWDMs 311, 321 and 322 wherein Δλ is the window spacing and δλ is the window bandwidth. The dash curve and the solid curve in FIG. 3C indicates respectively the insertion loss in channels 30-321 and 30-322. The dash curve and the solid curve in FIG. 3D indicates respectively the insertion loss in channels 34-311 and 32-311. The dash curve and the solid curve in FIG. 3E indicates respectively the insertion loss in channels 33-311 and 31-311.

Figure 4:
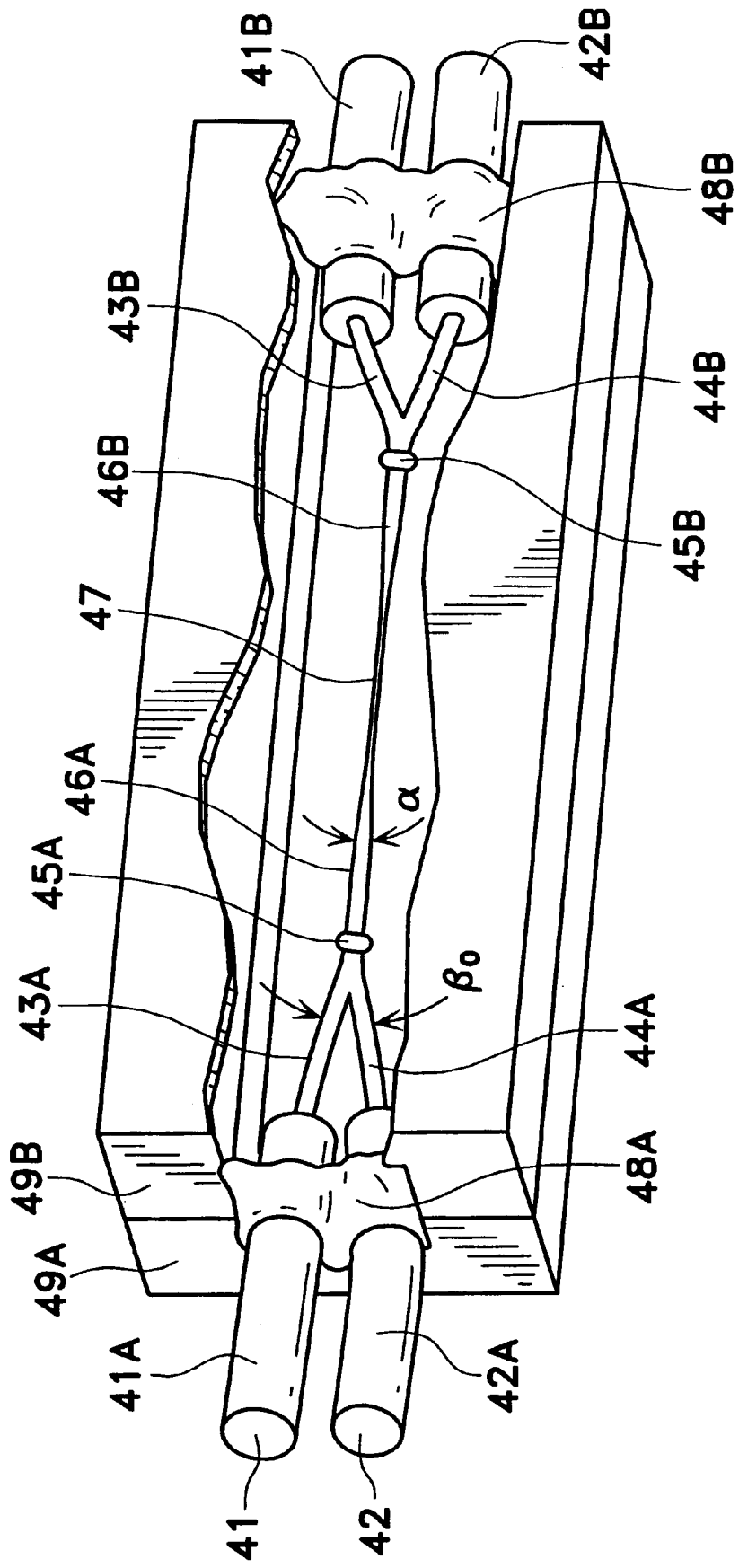
FIG. 4 shows the FBT MWDM being glued to a substrate.

Referring to FIG. 4, there is shown a structure of a 2×2 MWDM 400 according to the invention. The numerals 41A and 41B are two ends of a first fiber 41. The numerals 42A and 42B are two ends of a second fiber 42. These two fibers are crossed two times or more at a cross angle $\beta_0$ and fused together around an extended center portion of each by local heating and stretching to create a biconical structure referred to as a tapered fiber. The first conic 46A and the second conic 46B are formed at a tapering angle α. The numeral 47 is a fiber cavity having a smaller diameter than the diameters of the first and the second fiber 41 and 42. The numeral 49A is a quartz substrate, 49B is a housing cover. The fiber ends 41A, 41B, 42A and 42B are firmly glued to or fused by laser to the quartz substrate 49A. The fibers are vulcanized at room temperature. The housing cover could be a stainless steel tuber or any other metal plastic tuber.

Figure 5:
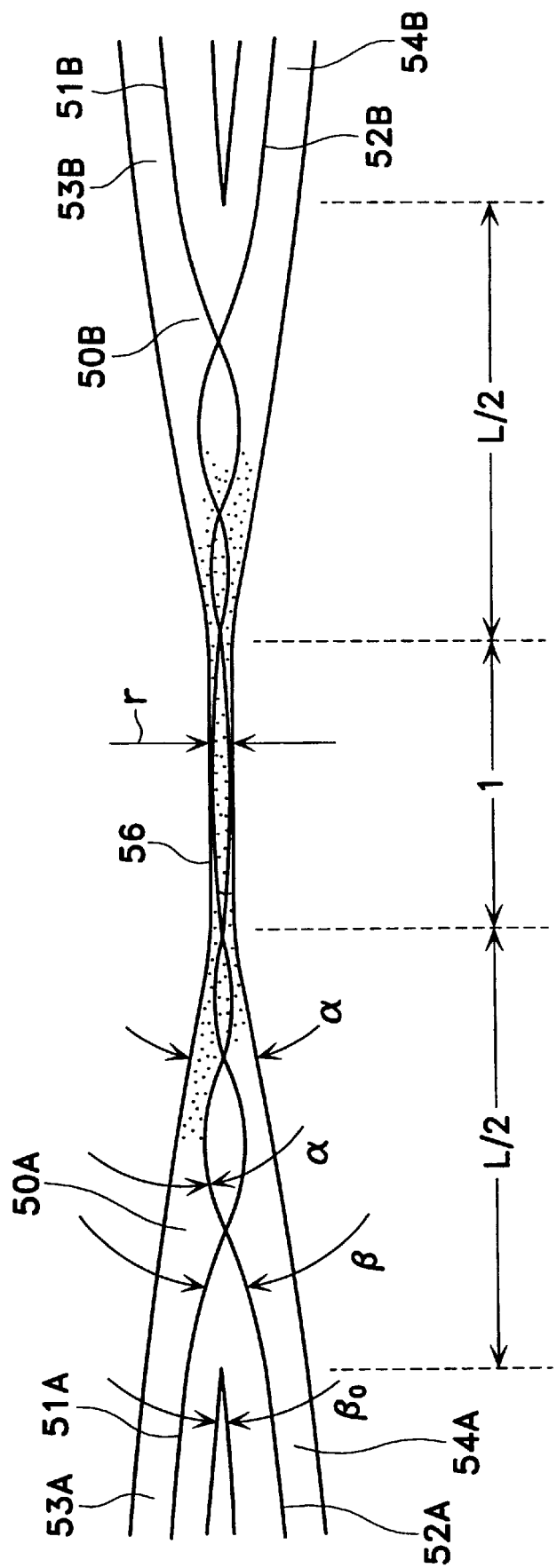
FIG. 5 is the structure diagram of the tapering and coupling area of the FBT MWDM of present invention.

FIG. 5 shows the detailed structure of a coupling area including the first conic 50A, a fiber cavity 56 and the second conic 50B. The first conic and the second conic 50A and 50B have same taping angle α and length L. The fiber cavity 56 has a diameter r and length 1. The first conic 50A has a first core 51A and a second core 52A as well as a surrounding cladding 53A and 54A. The second conic 50B has a first core 51B and a second core 52B as well as a surrounding cladding 53B and 54B. The cores 51A and 52A are cross one time at least in the first conic 50A. The core 51B and 52B are crossed one time at least in the second conic 50B. The crossing angles are same as $\beta_0$. In order to achieve the multiwindow transmission effect, a variety of geometrical parameters of the coupling area plays a decision role. The length 1 of the fiber cavity 56 is in a range of 5 to 30 mm, the diameter r of the fiber cavity is in a range of 3 to 20 μm, the tapered angle α is between 0.05°–5°, and the ratio L/1 is about 0.3–1.5, for example, if the length of the fiber cavity 1 is about 20 mm, then the length of pulling distance L is about 6–45 mm such that 1 is determined substantially by a length of heating area at which a fire frame is used to facilitate fiber fusion. The length of the fiber cavity 1 is fixed in the pulling process while the pulling distance L will increase with the lapse of the pulling time.

Figure 7:
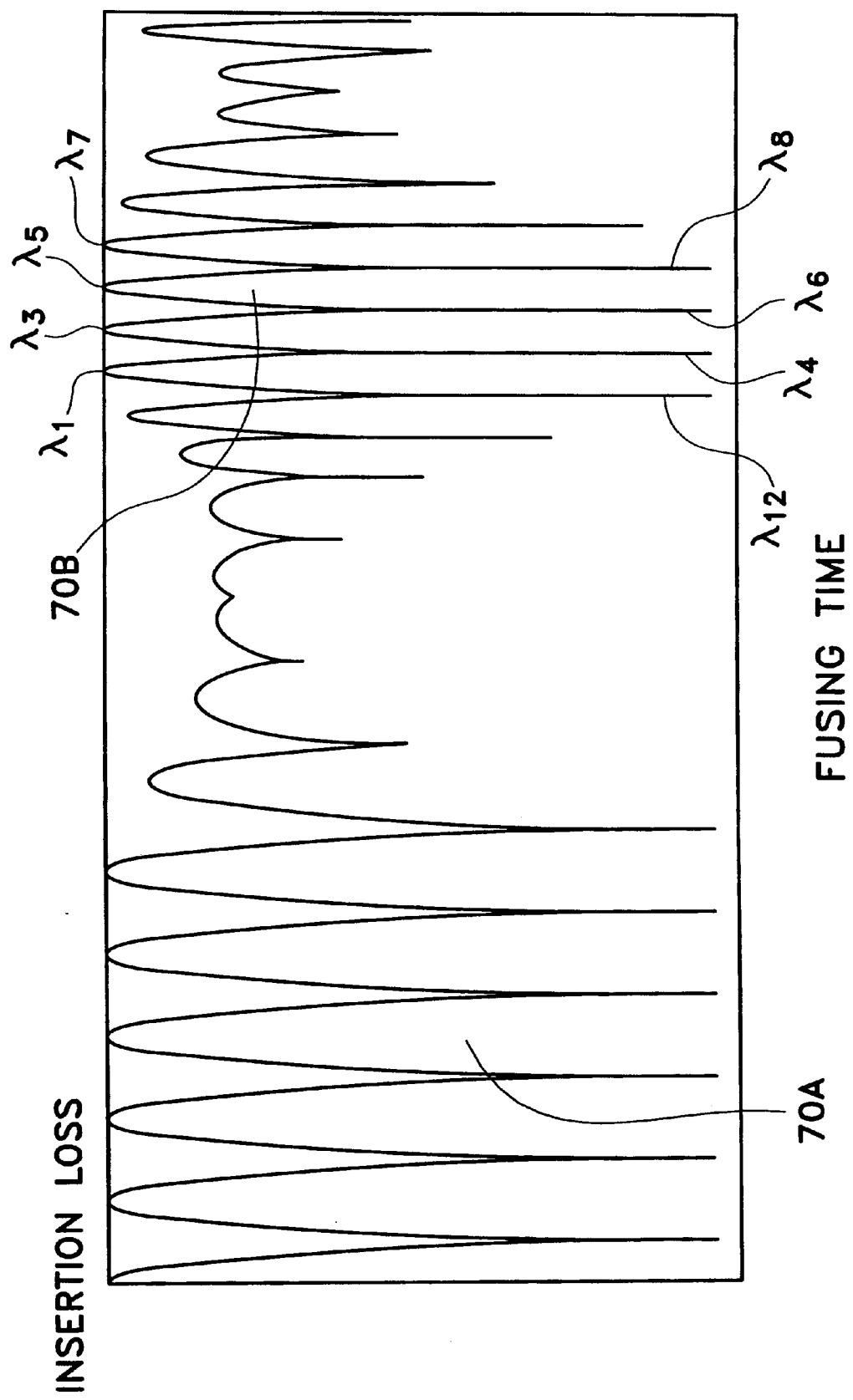
FIG. 7 is a spectral insertion loss of a FBT MWDM of the present invention.

Referring now jointly to FIGS. 5 and 7, the optical characteristic of the MWDM constructed according to FIG. 5 is discussed. As wideband light signals input in the first core 51A from a single-mode, they are not transmitting along the core 51A, because incident angles of the light beams transmitting in 51A is dependent on the times of reflection (s) at interface surfaces between the core and the cladding, the incident angles of the light could be 90-α-β, 90-2α-β, 90-3α-β, . . . , 90-sα-β. If sα+β is large enough and the incident angle 90-sα-β is less than Frenal angle at the interface surfaces of the core and the cladding, instead of transmitting in multi-mode in the surrounding claddings 53A and 53B and the fiber cavity 56, the lights in different mode have different transmission angles and different optical lengths in the fire cavity 56. As a consequence, these lights will interfere with each other in the second conic or tapering area 50B. When these signals left the second conic 50B, they are transmitting in the two core 51B and 52B and back to single-mode again, thereby changing to two signals redistributed by their wavelengths.

FIG. 7 illustrates a spectral transmission of one of the channels 51A–51B and the channels 51A–52B. The spectral transmission is a sine curve enveloped by another sine curve to form a series of wave pockets. As an example for illustration, 70A and 70B designate the first two pockets of such series of wave pockets. There are a couples of low loss transmission peaks in every pocket. For instance, the transmission loss reaches minimum at the wavelengths $\lambda_2, \lambda_4, \lambda_6, \lambda_8$, and reaches maximum at the wavelengths $\lambda_1, \lambda_3, \lambda_5, \lambda_7$ in the pocket 70B at the first core 52B. Notably, the longer the fusing time, the lower the number of the transmission peak and more narrow the window spacing. This is the main difference between the present invention and the prior art WDM.

Figure 6A:
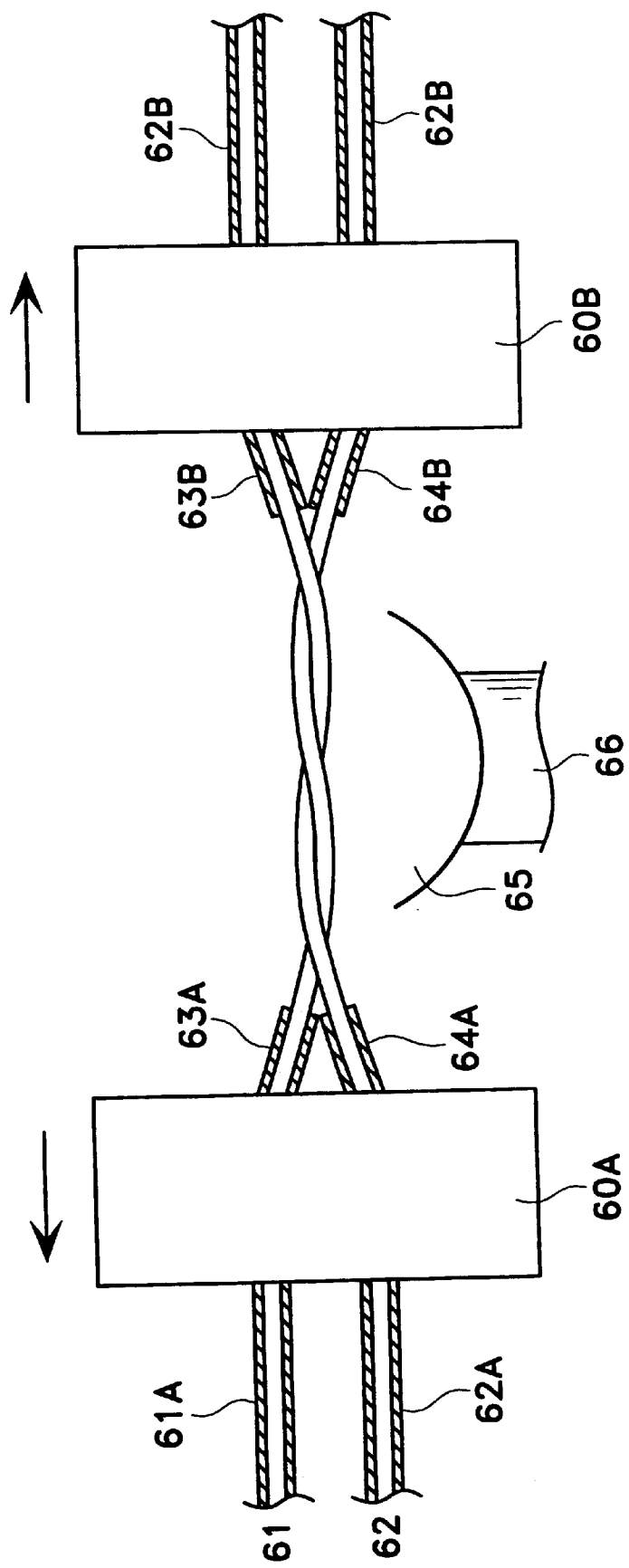
FIG. 6A shows two optical fibers in the process of being fused by stretching and heating.

The method of fabrication of the fused MWDM of the present invention is illustrated in FIG. 6A. The first fiber 61 has a first end 61A and a second end 61B. The second fiber 62 has a first end 62A and a second end 62B. A wideband light source $\lambda_0$ is entered either to 61A or to 62A. Either 61B or 62B is being monitored by a power meter to determine the time when the drawing stopped. The output light from the light source $\lambda_0$ is monitored by an optical spectral analyzer to determine whether the multi-window transmission phenomenon of the fused fiber is appearing. A first step in the fabrication involves removal of buffers 63A and 64B as well as 63B and 64B from the two optical fibers 61 and 62 for some distance (about 10–50 mm around an extended central portion of these fibers, then etching the optical fibers to adjust the thickness of the cladding (the thickness change is around 0–30 um), forcing the two fibers together at the center place by crossing the two fibers several times at a crossing angle $\beta_0$ or use some other mechanical means to put the center place together, presenting the length of the fiber above a fire frame 65 by adjusting a heating source 66, heating the center place until the two fibers fused together, then start moving a pair of fiber holders 60A and 60B away from each other with a first constant speed and then gradually a slow speed in range of 1 cm/minute to 50 cm/minute to form two fused biconical tapers, each respectively on one end of the fiber cavity 56 until appearance of the multi-window transmission curve with a predetermined window spacing to the optical spectral analyzer and a maximum output power on the power meter. The length of the fiber cavity 56 is same as the length of fiber in the heating area. It is advisable that the stretched distance of the fused fiber is preferably about 0.3–1.5 times of the length of the heating area, which is the length of the fibers presented to the fire frame 65 during the tepering process.

The etching method could be chemical corrosion, laser abrasion or ion milling techniques. The heating method could be a fire heating, arc discharging heating or laser heating. The way to put the two fibers together could be crossing them together, twisting them together or parallel fixing the two ends of each fiber followed by forcing the center place together. It also requires a fast response monitor system like an optical spectral analyzer, DWDM analyzer, or other multi-channel power meters to monitor the heating and stretching process for detecting the MWDM characteristics.

Figure 6B:
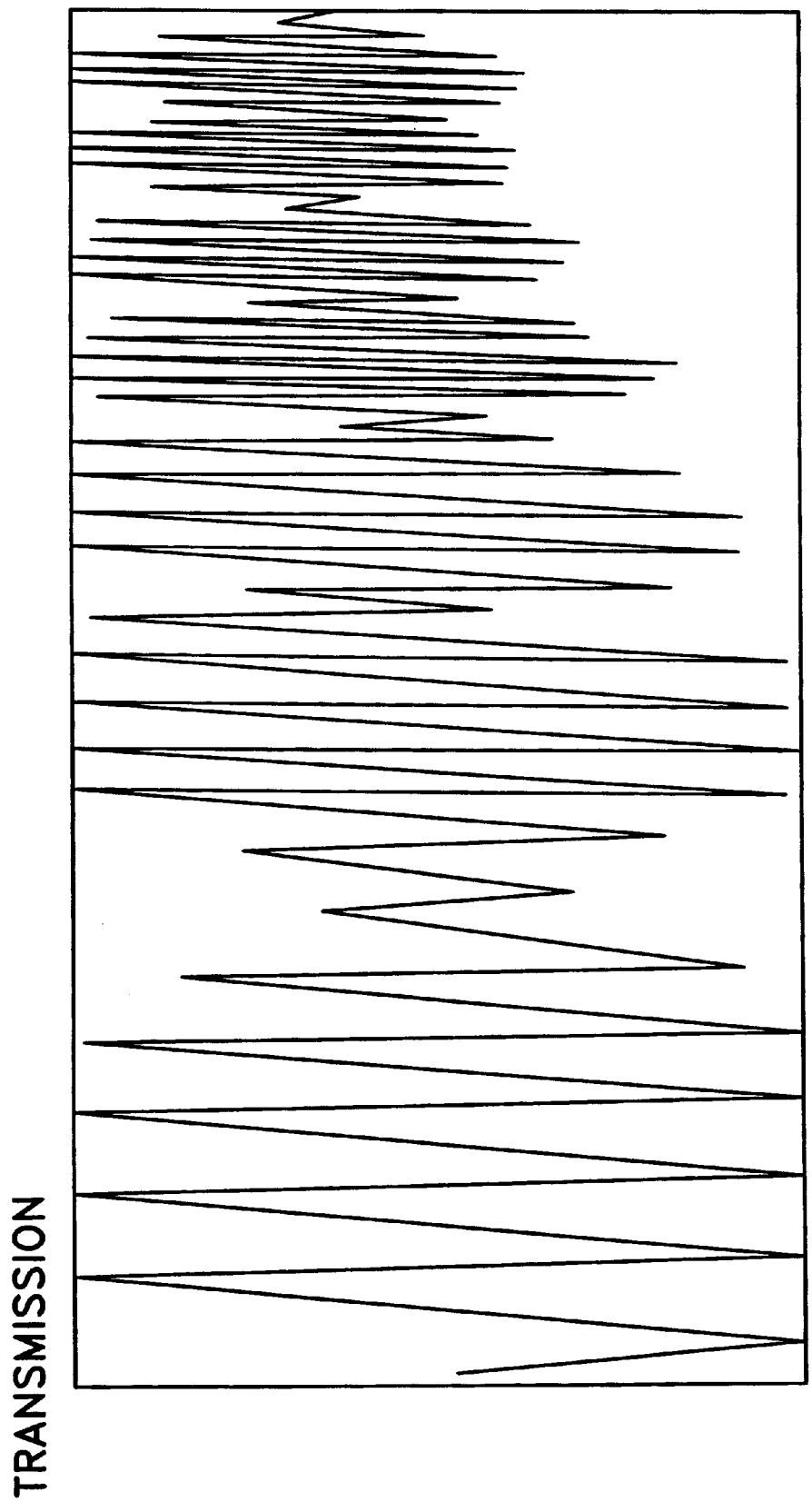
FIG. 6B is a exemplary graphical curve of a FBT MWDM of the present invention to illustrate the relationship between the transmission and drawing time.
Figure 6C:
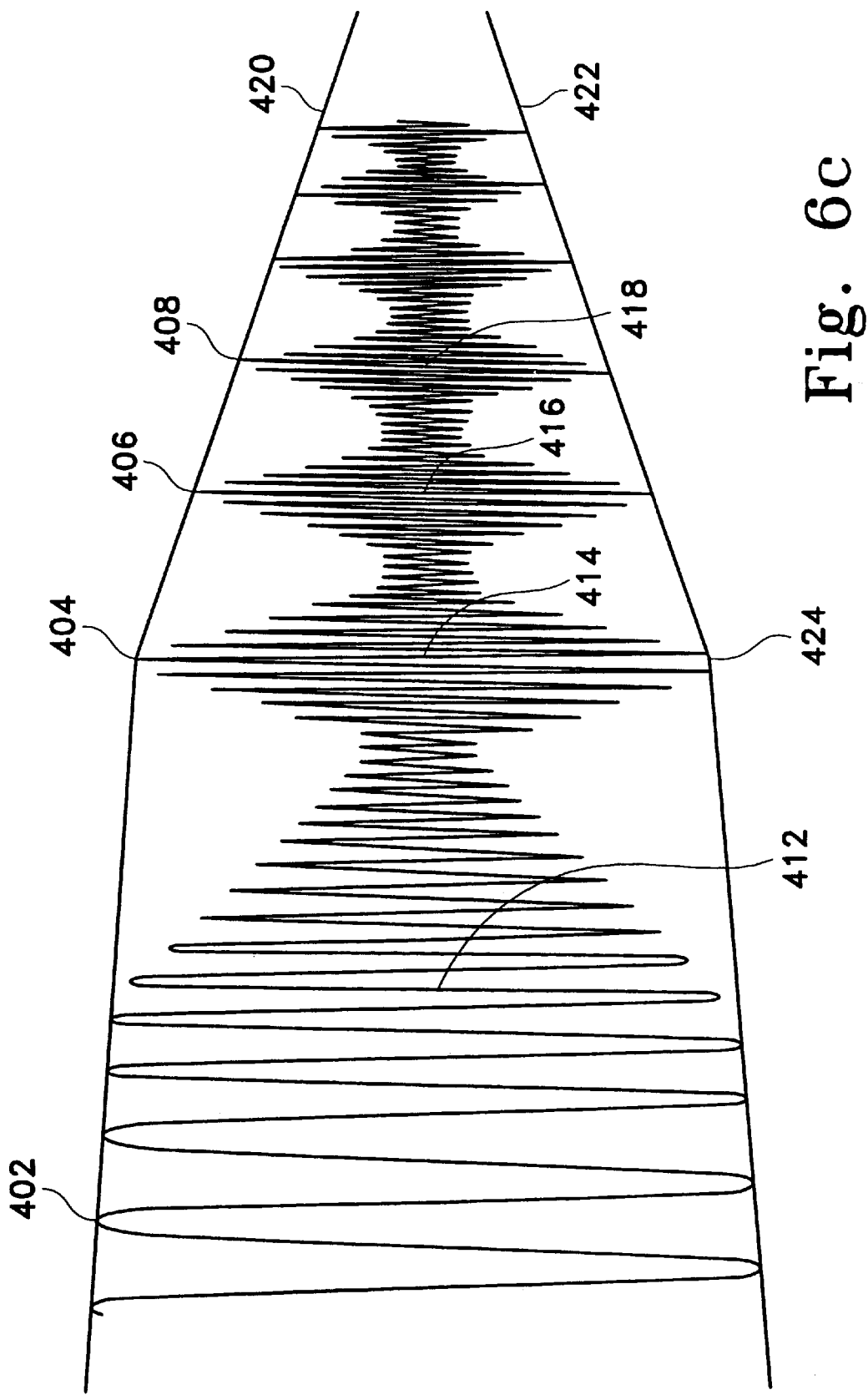
FIG. 6C is the a prior art graphical curve of a narrow band WDM disclosed by U.S. Pat. No. 5,491,764.

Referring to FIG. 6B, there is shown a graphical representation of an exemplary waveform output from the power meter. The spectral transmission is a sine curve enveloped by another sine curve to form a series of wave pockets. At each peak, several of the signals will reach a maximum and the others a minimum. The difference between the maximum and the minimum is known as "an isolation" between signals. There are a couples of low loss transmission peaks in every pocket and the insertion losses at such peak wavelengths in all wave pockets are near 0 dB. Compared to the prior art spectrum disclosed by U.S. Pat. No. 5,491,764 as graphically illustrated in FIG. 6C, the waveform output from the narrow band prior art WDM has a sinusoidal wave pattern consisting of several peaks as indicated by reference numerals 402 404, 406, 408. At each of such peaks, only one of the signals will reach a maximum and the other a minimum. Consequently, the prior art WDM is incapable of being used as a multi-window wavelength division multiplexer because it is inherently limited to enable only one, not several, of the signals to reach a maximum and the other a minimum transmission. Furthermore, Unlike the spectral transmission illustrated by the present invention, the prior art WDM appeared to suffer significant transmission losses, such losses enlarged as the drawing time increased, which resulted in the decreases in the isolation between signals such that the signal wavelengths will eventually merge, as shown by the two converging lines 420, 422. In view of the foregoing, it is clearly that the twisted optical fiber WDM of the prior art is incapable of forming a MWDM having more than two channels. It is further noted that the present invention uses a crossed pair of fibers, instead of a prior art twisted pair of fibers, to improve the polarization dependent loss.

This fused biconical tapered fiber optical coupler are covered with a substrate 49A, as shown in FIG. 4. Each end of fusing fiber are fixed on 49A by using glue ball with a very small diameter or by using other welding techniques. At the ends 48A and 48B, the fibers are fixed and sealed with an epoxy to prevent any particles from entering into the coupling area.

The invention now being fully described, it will be apparent to one of ordinary skill in the art that many changes and modifications can be made thereto without departing from the spirit or scope of the invention as set forth herein.

I claim:

1. A structure for coupling optical fibers, comprising:

a first portion including a first optical fiber and a second optical fiber, said second optical fiber having a diameter substantially equal to a diameter of the firs optical fiber;

a second portion including the first optical fiber and a second optical fiber;

a first conic region formed by a fusion of the first optical fiber and the second optical fiber and having a first end adjacent said first portion, whereby the first end of the first conic region has a larger cross-section than a second end of the first conic region;

a fiber cavity having a first end adjacent the second end of the first conic region, said fiber cavity having a diameter smaller than the diameters of the first optical fiber and the second optical fiber; and a second conic region formed by a fusion of the first optical fiber and the second optical fiber and having a first end adjacent a second end of the fiber cavity, whereby the first end of the second conic region has a smaller cross-section than a cross-section of a second end of the second conic region, said second end of the second conic region being adjacent said second portion.

\* \* \* \* \*